US009680502B2

(12) United States Patent
Thaler et al.

(10) Patent No.: US 9,680,502 B2
(45) Date of Patent: Jun. 13, 2017

(54) MESSAGE PAGE INTEGRITY VERIFICATION IN AUTOMOTIVE NETWORK AUTO-NEGOTIATION

(71) Applicant: AVAGO TECHNOLOGIES GENERAL IP (SINGAPORE) PTE. LTD., Singapore (SG)

(72) Inventors: Patricia Ann Thaler, Carmichael, CA (US); Maurice David Caldwell, Robbinsville, NJ (US); Gregory Lee Silvus, Boulder, CO (US)

(73) Assignee: AVAGO TECHNOLOGIES GENERAL IP (SINGAPORE) PTE. LTD., Singapore (SG)

(*) Notice: Subject to any disclaimer, the term of this patent is extended or adjusted under 35 U.S.C. 154(b) by 6 days.

(21) Appl. No.: 14/705,590

(22) Filed: May 6, 2015

(65) Prior Publication Data
US 2015/0324249 A1    Nov. 12, 2015

Related U.S. Application Data

(60) Provisional application No. 61/991,412, filed on May 9, 2014.

(51) Int. Cl.
| H03M 13/11 | (2006.01) |
| H03M 13/09 | (2006.01) |
| G06F 11/10 | (2006.01) |
| H04L 1/00 | (2006.01) |
| H04L 5/16 | (2006.01) |
| H04L 29/06 | (2006.01) |

(52) U.S. Cl.
CPC ......... H03M 13/09 (2013.01); G06F 11/1004 (2013.01); H04L 1/0061 (2013.01); H04L 5/16 (2013.01); H04L 63/123 (2013.01)

(58) Field of Classification Search
CPC ...................................................... H03M 13/11
USPC .................................. 714/758, 799, 748, 800
See application file for complete search history.

(56) References Cited

U.S. PATENT DOCUMENTS

| 5,636,037 A * | 6/1997 | Saitoh ..................... H04M 11/06 358/400 |
| 6,182,219 B1 * | 1/2001 | Feldbau ............. G06Q 20/3674 380/258 |
| 6,389,292 B2 * | 5/2002 | Biedermann ...... H04Q 11/0457 370/424 |
| 6,434,399 B1 * | 8/2002 | Kamperschroer .... H04W 48/20 370/332 |
| 6,467,003 B1 * | 10/2002 | Doerenberg ......... G05D 1/0077 710/117 |

(Continued)

Primary Examiner — Fritz Alphonse
(74) Attorney, Agent, or Firm — Oblon, McClelland, Maier & Neustadt, L.L.P.

(57) ABSTRACT

A transmitting device may implement a checksum for integrity verification for a message page during an auto-negotiation period. The checksum may provide redundancy to ensure the integrity of the message page after transmission. The checksum may be calculated based on the message page and appended to the message page for transmission. A receiving device may receive the message page with the appended checksum and calculate a checksum locally using the received message page. The calculated and received checksum may be compared by the receiving device to verify the integrity of the message.

20 Claims, 12 Drawing Sheets

(56) References Cited

U.S. PATENT DOCUMENTS 6,918,001 B2 * 7/2005 Fanning .............. G06F 13/4022
710/316
7,801,078 B2 * 9/2010 Kim ................... H04L 12/2854
370/255

* cited by examiner

MESSAGE PAGE INTEGRITY VERIFICATION IN AUTOMOTIVE NETWORK AUTO-NEGOTIATION

PRIORITY CLAIM

This application claims priority to provisional application Ser. No. 61/991,412, filed May 9, 2014, which is entirely incorporated by reference.

TECHNICAL FIELD

This disclosure relates to integrity verification during auto-negotiation in automotive networks.

BACKGROUND

High speed data networks form part of the backbone of what has become indispensable worldwide data connectivity. Within the data networks, network devices such as switching devices direct data packets from source ports to destination ports, helping to eventually guide the data packets from a source to a destination. Improvements in network handling, including improvements in connection establishment, will further enhance performance of data networks.

BRIEF DESCRIPTION OF THE DRAWINGS

FIG. 7 shows an example 56-bit combined message.

DETAILED DESCRIPTION

The disclosure below concerns techniques and architectures for error checks for auto-negotiation signaling, e.g., by the use of a checksum, hash, or other integrity check. For example, a cyclic redundancy check (CRC) may be implemented by the system. The example device described below provides an example context for explaining the techniques and architectures to support integrity verification for auto-negotiation.

Figure 1:
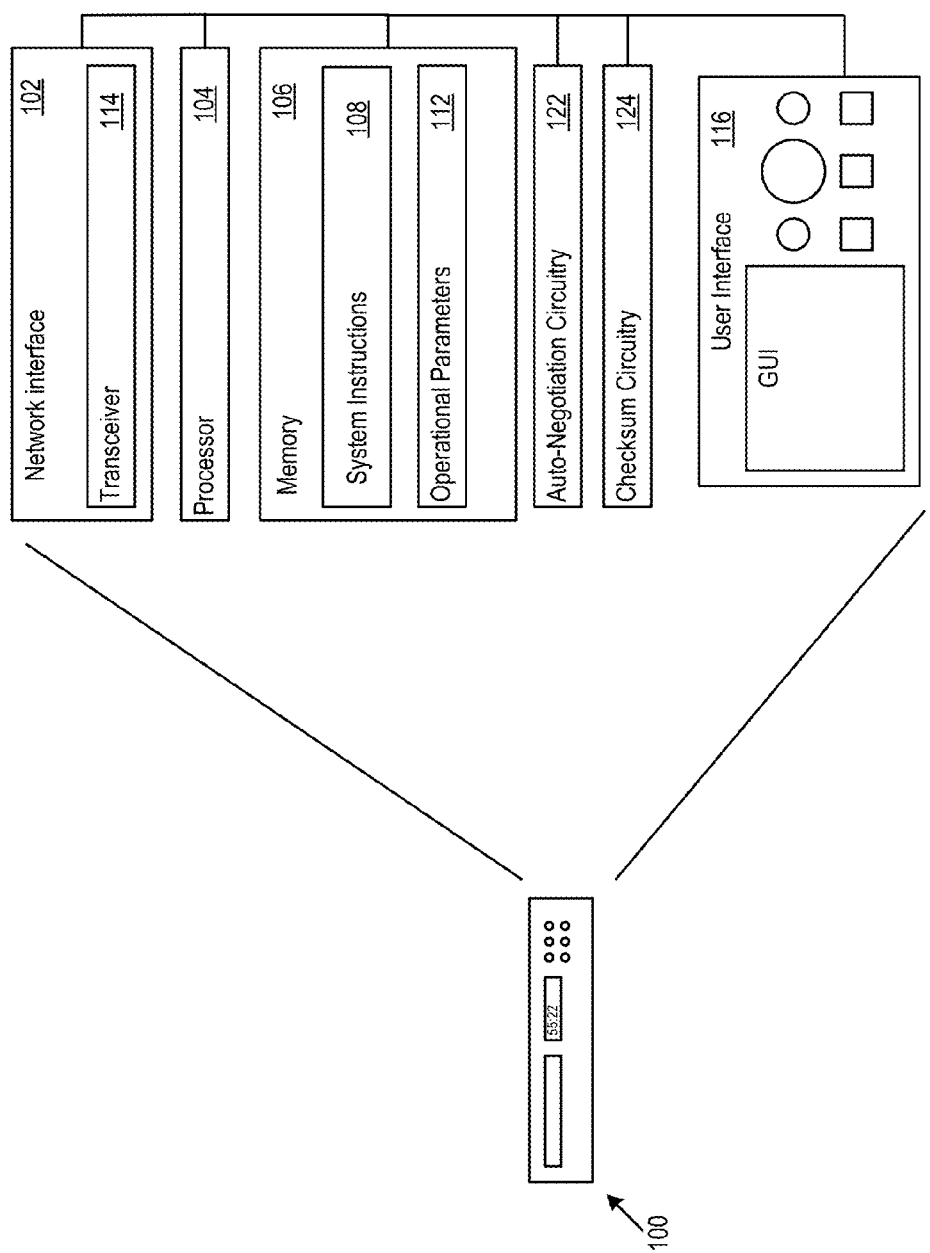
FIG. 1 shows an example device.

FIG. 1 shows an example device 100. In one example, the device 100 may be a communication device, such as a peripheral or device in an automotive network, a 1G-BASE-T1 device, laptop computer, router, or server. However, the device 100 may be virtually any device, e.g., implementing a network interface compatible with multiple protocols. For example, backbone networking hardware, a gaming console, a television set-top box, or other networking device may use the architectures described below.

The device 100 may include a network interface 102 configured to support network communications over multiple protocols, and one or more processors 104 to support execution of applications and operating systems, and to govern operation of the device. Further, the one or more processors 104 may run processes to determine the transmission protocol that is active on the interface 102. The device 100 may include memory 106 for execution support and storage of system instructions 108 and operational parameters 112. The communication device 100 may include a user interface 116 to allow for user operation of the device. A transceiver 114 within the network interface 102 may also be included to support transmission and/or reception of signals. The transceiver 114 may be configured to support transmission of messages with appended CRC. Various portions of the network interface 102, including the transceiver 114, may be used to support the physical (PHY) layer of a networking stack running on the device 100.

The device 100 may further include auto-negotiation circuitry 122 which may support message page generation and exchange. The message pages may allow for exchange of network capabilities to allow devices in communication to select link protocols that are mutually supported by the communicating devices. The device 100 may use checksums or other integrity checks to identify errors in the message pages. Checksum circuitry 124 may be used to generate checksums that may be appended to messages for transmission or used to verify the integrity of received messages.

Figure 2:
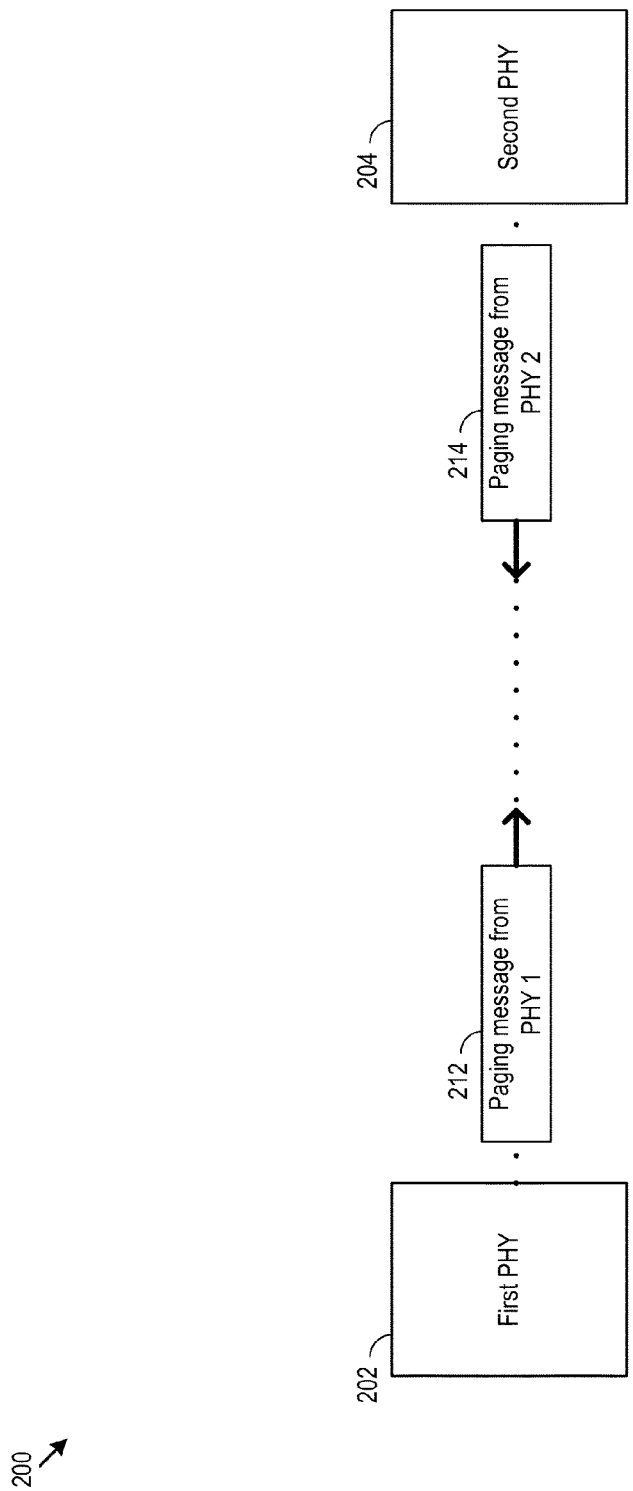
FIG. 2 shows an example auto-negotiation process.

FIG. 2 shows an example auto-negotiation process 200. Pages 212 from the first PHY layer 202 and pages 214 from the second PHY layer 204 (and corresponding responses) may be exchanged. The first and second PHY layers 202, 204 may engage in auto-negotiation to determine respective capabilities of the PHYs layers 202 and 204. In some implementations, the auto negotiation may be half-duplex. Once the PHY layers exchange their capability information and determine compatibility, a link may be established. In some implementations, the link may implement full-duplex communication, including some cases in which the auto-negotiation period used half-duplex communications.

In some cases, the auto-negotiating devices may ensure the integrity of the transmitted pages during auto-negotiation process by including error checking information, redundancy, or other types of error checking, in the messages. For example, multiple instances of the same message page may be sent from one the PHY layers (e.g., PHY layer 202). The receiving PHY layer (e.g., PHY layer 204) may compare the multiple instances for differences and request resending or apply the copies in an error correction scheme.

In some implementations, a CRC may be appended to a message page to provide redundancy. In one example, and 8-bit CRC (CRC8) may be appended to a 48-bit message page in a 1G-BASE-T1 auto-negotiation process to create a 56-bit message page. In the example, the CRC8 may be generated using a CRC8 generator, which evaluates the CRC generation function: $G1(x)=x^8+x^2+x+1$. However, other length CRCs and CRC generation functions may be implemented. In some implementations, the CRC may obviate sending repeated instances of the same message. In some cases, the auto-negotiation process may be shortened by reducing the number of pages sent.

Figure 3:
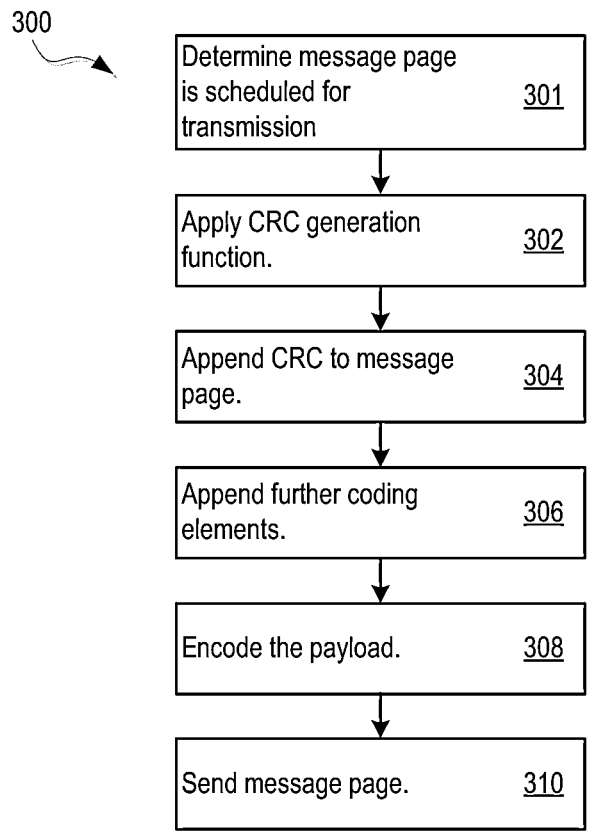
FIG. 3 shows example logic for cyclic redundancy check (CRC) generation.

FIG. 3 shows example logic 300 for CRC generation. The logic 300 may determine that a message page is scheduled for transmission (301). The example logic 300 may apply a CRC generation function to the message page (302). For example, the logic 300 may apply the $G1(x)$ function to a 48-bit base page to generate a CRC8. In another example, the logic 300 may apply the $G1(x)$ function to a 48-bit next page to generate a CRC8. The logic 300 may append the CRC to the message page (304). In the examples using the base page and next page, the CRC8s may be appended to the 48-bit messages to generate 56-bit message. In some cases, the combined message page and CRC may be appended to a further coding element to generate a payload for transmission (306). For example, the logic 300 may further append a pseudo-random bit to the 56-bit combined message to ensure random toggling of a subsequent differential Manchester encoding (DME) page delimiter. In the example, the CRC8, 48-bit page, and the pseudo random bit generate a 57-bit payload. The logic 300 may encode the payload (308). For example, the payload may be encoded using a DME algorithm. The logic 300 may send the encoded payload to another communication node (310), e.g., to support an auto-negotiation process.

Figure 4:
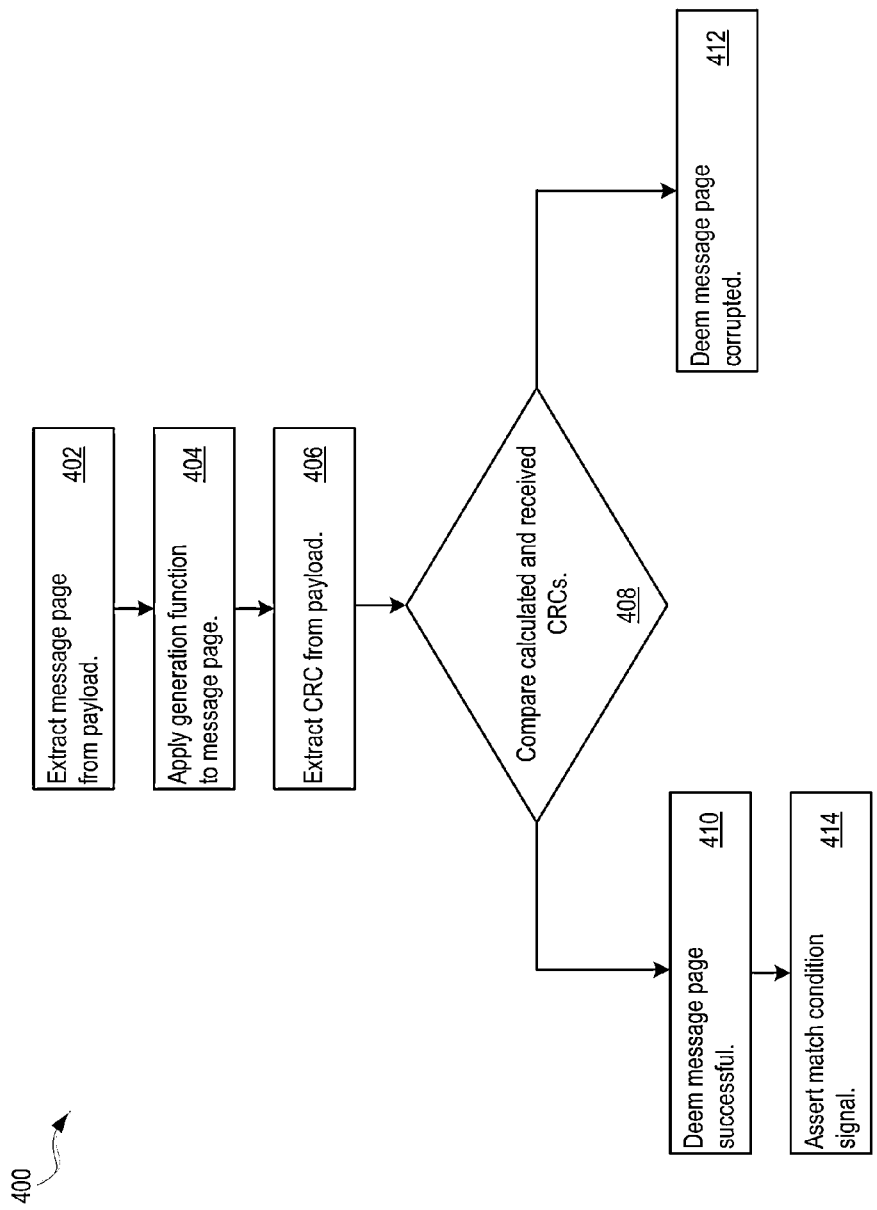
FIG. 4 shows example logic for CRC reception and evaluation.

FIG. 4 shows example logic 400 for CRC reception and evaluation. The logic 400 may extract the message page from the communication (402C). For example, the logic 400 may decoding the DME encoded payload and extract the 48-bit message page. The logic may apply a CRC generation function to the message page to generate a CRC (404). For example, the logic 400 may apply the G1($x$) function to the 48-bit message page to generate a CRC8. The logic may extract the CRC from the received payload (406). The logic may compare the generated CRC to the extracted CRC (408). If the extracted CRC and the received CRC match, the message page may be deemed by the logic 400 to have been received and decoded successfully (410). If the extracted CRC and received CRC do not match, the message page may be deemed by the logic 400 to have been corrupted (412). In some cases, a corrupted message page may be discarded. In various implementations, a new instance of the message page may be re-sent due to a timeout or other indicator (e.g., failure to receive a response or acknowledgement of the message page). In other implementations, the receiving PHY layer may send a paging resend request to the originating PHY layer, or apply error correction if error correction information was also provided (in addition to or as an alternative to the CRC) with the message page. Additionally or alternatively, the auto-negotiation process may be restarted.

In some implementations, the logic 400 may assert a match condition signal when the received CRC is the same as the locally evaluated CRC (414). For example, a signal may be sent to auto-negotiation logic to proceed with the negotiation process.

Figure 5:
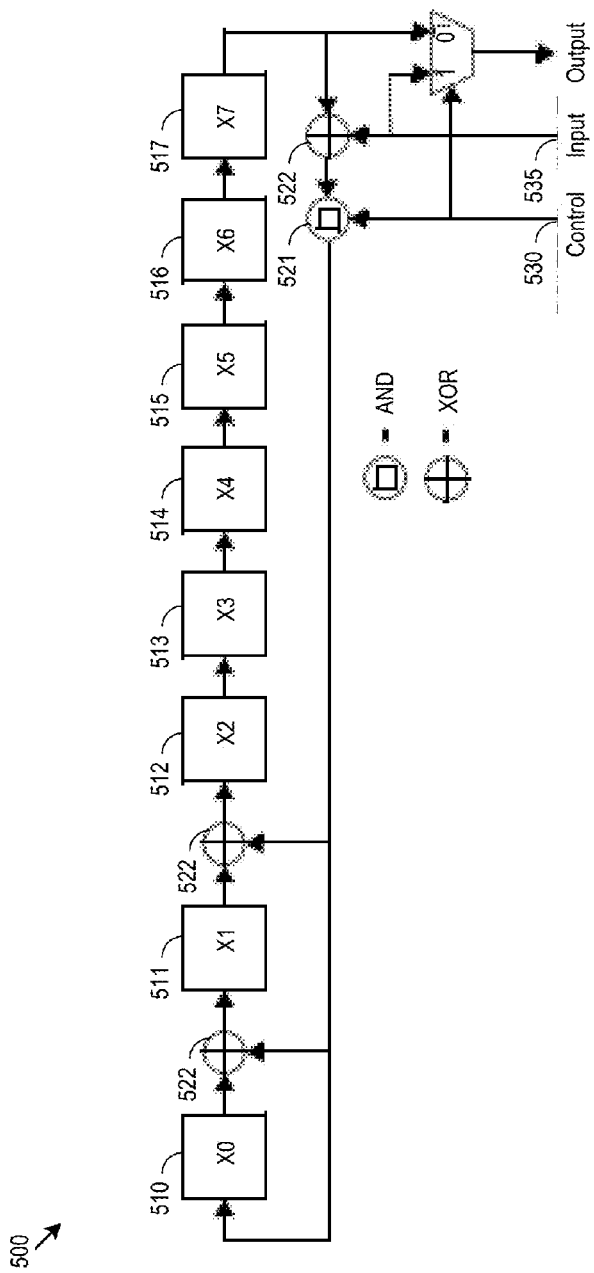
FIG. 5 shows an example CRC8 generator circuitry.

FIG. 5 shows an example CRC8 generator circuitry 500. The example CRC8 generator circuitry may be used to generate a CRC8 using the polynomial $x^8+x^2+x+1$. The generator circuitry 500 may include delay elements 510-517. In various implementations, the delay elements may be initialized to values of 0x00 prior to calculation of a CRC8. However, other initialization values may be used in various implementations. The CRC8 circuitry further includes AND logic 521 and XOR logic 522. A value of 1 may be asserted to the control port 530 when shifting the modified preamble and calculating the CRC. A value of 0 may be asserted to the control port 530 when transmitting the CRC8 field. The input bits may be applied to the input port 535. In some implementations, the first 48-bits of the auto-negotiation page (either a base or next page) may be serially shifted, with the least significant bit first, to compute the CRC8 value, which is the resulting contents of the shift register.

In various implementations other checksum types may be used. For example, hash generators or other checksum circuitry may be used to generate bits that may be used to verify the integrity of transmitted message pages.

Figure 6:
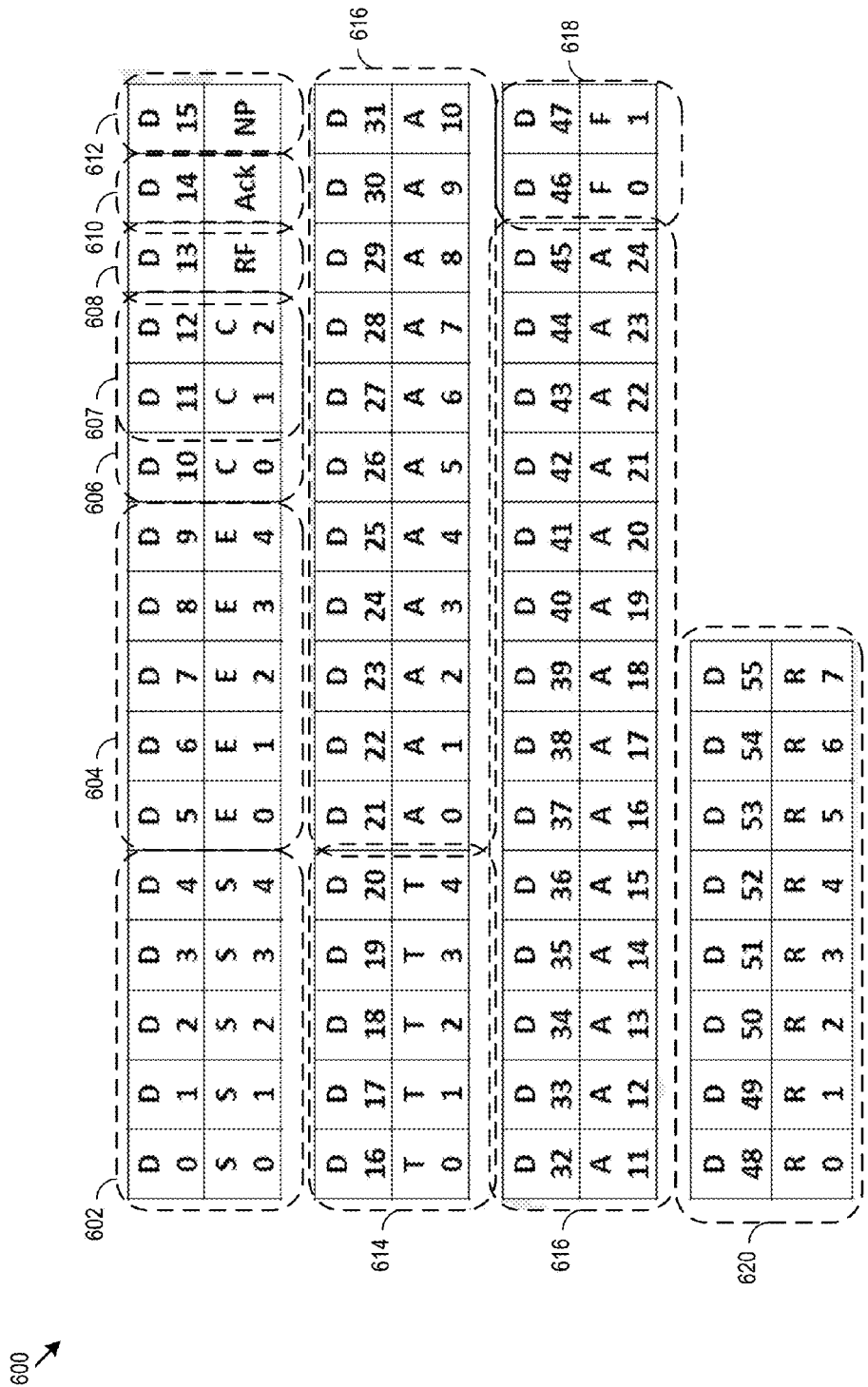
FIG. 6 shows an example 56-bit combined message.

FIG. 6 shows an example 56-bit combined message page 600. The example combined message page 600 may include the 48-bit base page and a CRC8. The "S" bits 602 include the selector field. The "E" bits 604 include the echoed nonce field. The "C" bits 606 may be used to advertise capabilities not related to the PHY layer, including the pause capability at bits C1 and C0 607. The combined message page 600 may further include RF 608, Ack 610, and NP 612 bits. The "T" bits 614 may include the transmitted nonce field. The "A" bits 616 may include the technology ability field. The "F" bits 618 may include the forward error correction (FEC) capability field. The "R" bits 620 may include the CRC8.

Figure 7:
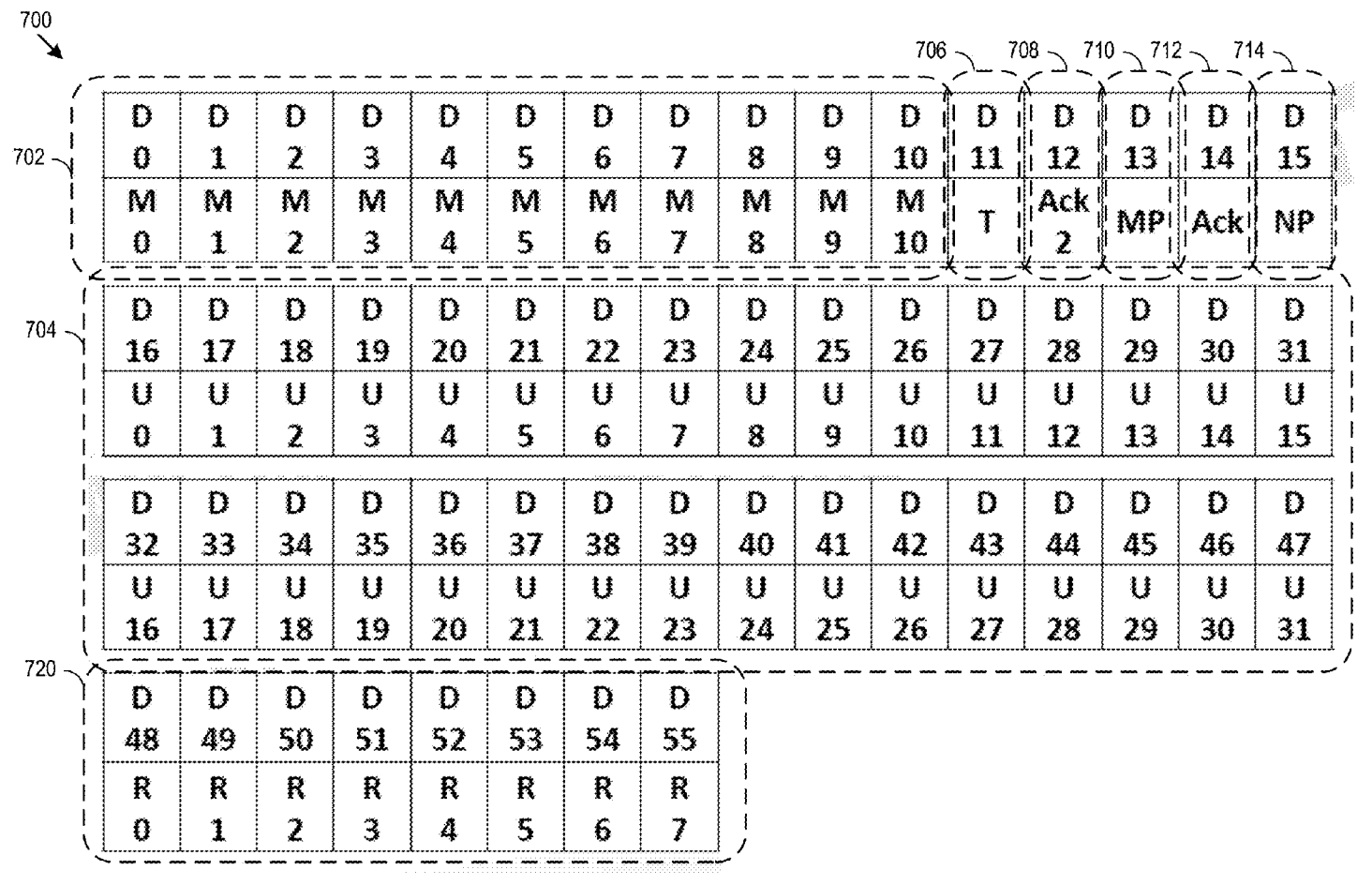

FIG. 7 shows an example 56-bit combined message page 700. The example combined message page 700 may include the 48-bit next page and a CRC8. The "M" bits 702 include the message code field. The "U" bits 704 include the unformatted code field. The combined message page 700 may further include, Ack bits 706, NP bits 708 bits, MP bits 710, Ack2 bits 712, and T bits 714. For next pages, the MP bit 710 may be set to a logical 1. In the next pages, the M bits 702 may include the message code field. For unformatted next pages, the MP bit 710 may be set to a logical 0 and the M bits 702 may also hold an unformatted code field in addition to the U bits 704. The R bits 720 may include the CRC8 in either next pages or unformatted next pages.

Figure 8:
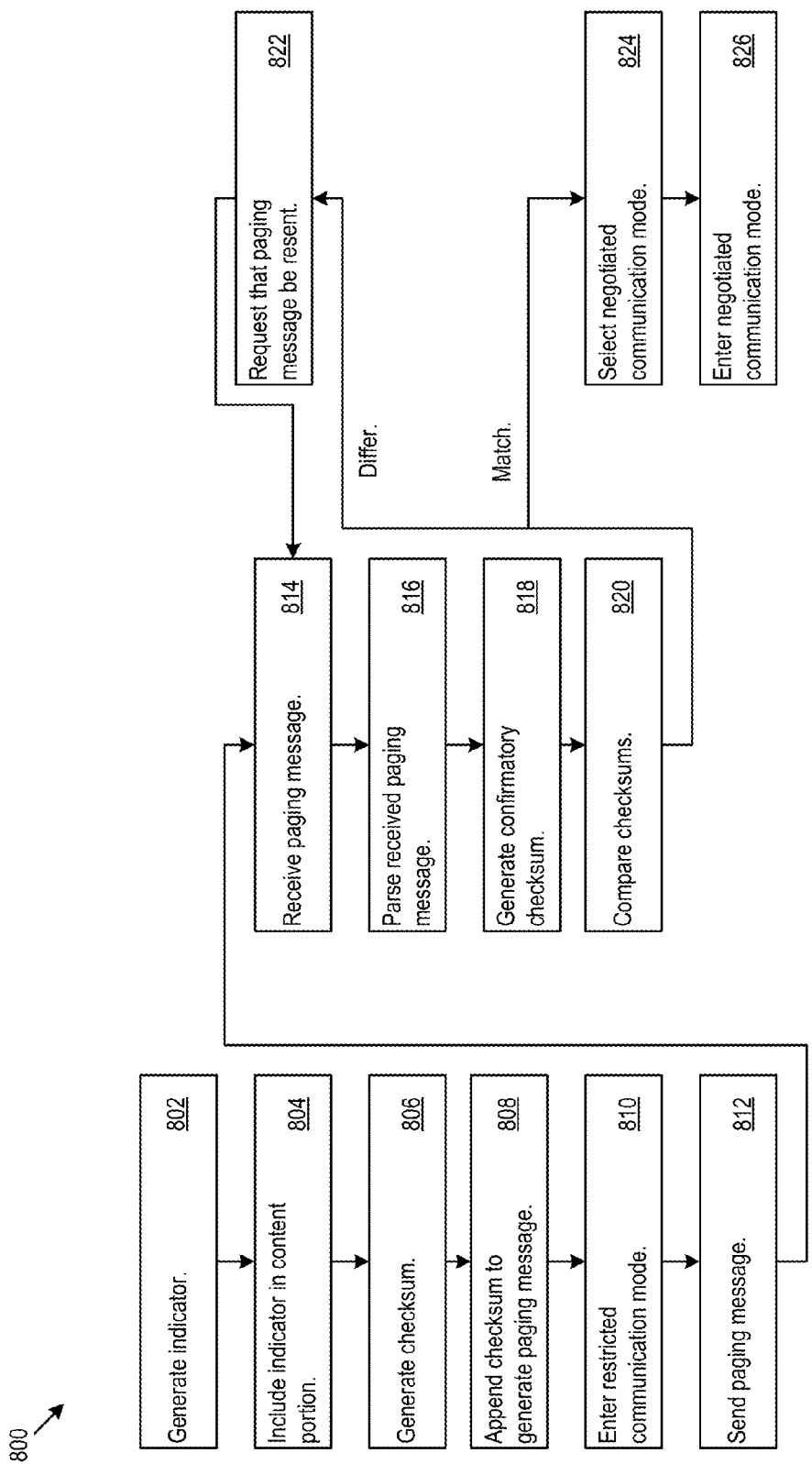
FIG. 8 shows example auto-negotiation logic.

FIG. 8 shows example auto-negotiation logic 800, which may be implemented on circuitry. The auto-negotiation logic may generate an indicator that may indicate one or more capabilities of a communication node on which the auto-negotiation logic is executing (802). For example, the indicator may list capabilities of the PHY layer of the node or capabilities of the network stack of the node. The auto-negotiation logic 800 may include the indicator in a content portion for a message page (804). The content portion may include other signaling in addition to the capability indicators, such as message acknowledgements, protocol identifiers, timing signals, or other message content. The auto-negotiation logic 800 may generate a checksum, e.g., a hash, a CRC, FEC bits, or the integrity verification data (806). For example, the auto-negotiation logic may use checksum circuitry 124 to generate the checksum. The auto-negotiation circuitry may append the checksum to the content portion to generate a message page (808).

The auto-negotiation logic may place a transceiver, e.g., within a network interface of a communication node, in a restricted communication mode (810). The restricted transmission mode may use a subset of the capabilities of the transceiver or a communication stack of the node. For example, the restricted communication mode may be a half-duplex mode in a case where the transceiver supports full-duplex communications. Additionally or alternatively, the restricted communication mode may omit FEC signaling. Other capabilities of the transceiver or communication stack may be unused in the restricted communication mode. In various implementations, the restricted communication mode may be selected based on a set of minimum required capabilities for devices connected to an automotive network.

While in the restricted communication mode, the auto-negotiation logic 800 may send the message page to another communication node (812), e.g., to support an auto-negotiation process. The auto-negotiation logic 800 may receive a message page from the other device while in the restricted communication mode (814).

The auto-negotiation logic 800 may parse the received message page to determine the content portion and the checksum (816). The auto-negotiation logic may generate a confirmatory checksum locally based on the content portion of the message (818). The auto-negotiation logic 800 may compare the checksum included in the received message with the confirmatory checksum (820). If the checksums differ, the auto-negotiation logic 800 may request that the other communication node resend the received message page (822). If the checksums match, the auto-negotiation logic 800 may compare the capabilities of the two communication nodes. The auto-negotiation logic 800 may select a negotiated mode based on overlapping capabilities of the two communication nodes (824). The auto-negotiation logic 800 may place the transceiver in the negotiated communication mode (826), e.g., by sending a negotiation result message over a signal bus within the communication node.

In some implementations, advanced capabilities from the set of overlapping capabilities from two PHYs may be selected. For example, the PHYs may both have half-duplex and full-duplex capabilities. In some cases, a full-duplex mode may be selected to take advantage of increased communication capacity in comparison with the half-duplex mode. Hence, in some cases, the most advanced capabilities common to both PHYs may be selected for the negotiated mode. However, in some cases parameters in addition to or instead of capability overlap may be used to select the negotiated mode. In some cases, channel quality, application parameters, negotiation timing constraints, regulatory constraints, or other parameters may be considered in selecting the negotiated mode.

Return Loss Estimation During Auto-Negotiation

The techniques and architectures discussed below may be implemented for estimating return loss during auto negotiation. In various implementations, intermission periods without transmissions, such as blind and wait periods, during auto-negotiation may provide an opportunity for estimating return loss. For example, return loss characteristics may be estimated during one or more the blind or wait periods after a transmission. A device may use the intermission periods, e.g., transmission free periods, to measure the time between the transmission of a signal and seeing reflections of the signal at its receiver. The reflections may originate from various points along the path. Discontinuities, such as, terminal loads, cable impurities, bends, or other discontinuities may cause reflections that may contribute to return loss.

Figure 9:
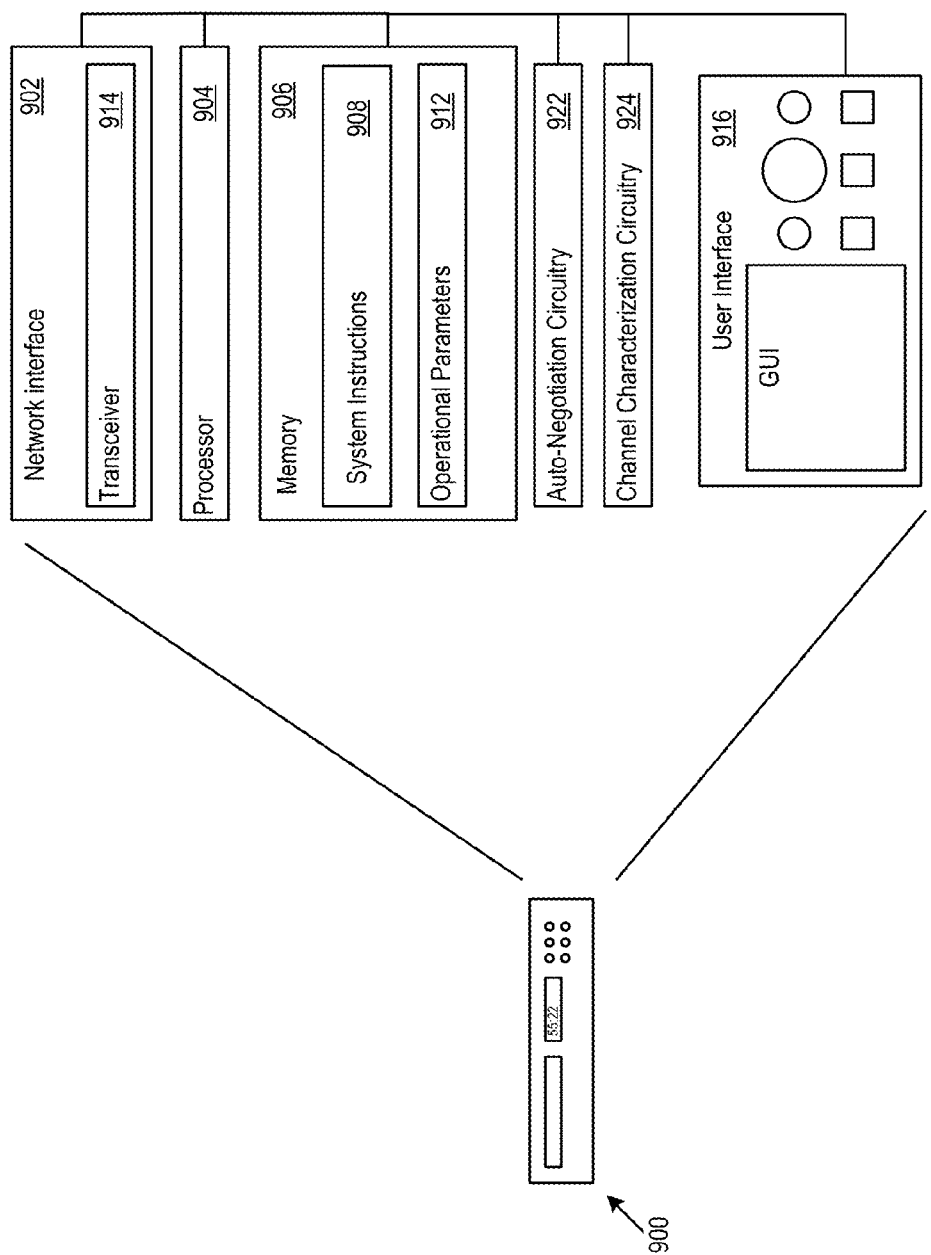
FIG. 9 shows an example device.

The example device described below provides an example context for explaining the techniques and architectures to support return loss estimation during auto-negotiation. FIG. 9 shows an example device 900. In one example, the device may be a communication device, such as a, peripheral or device in an automotive network, a 1G-BASE-T1 device, laptop computer, router, or server. However, the device may be virtually any device implementing a network interface compatible with multiple protocols. For example, backbone networking hardware, a gaming console, a television set-top box, or other networking device may use the architectures described below.

The device 900 may include a network interface 902 to support network communications over multiple protocols, and one or more processors 904 to support execution of applications and operating systems, and to govern operation of the device. Further, the one or more processors 904 may run processes to determine the transmission protocol that is active on the interface 902. The device 900 may include memory 906 for execution support and storage of system instructions 908 and operational parameters 912. The communication device 900 may include a user interface 916 to allow for user operation of the device. A transceiver 914 within the network interface 902 may also be included to support transmission and/or reception of signals. The device 900 may further include an echo canceller 918 which may be configured to undergo training during the transmission free periods. The transceiver 914 may be configured to support detection of reflected signals. Various portions of the network interface 902, including the transceiver 914 and/or the echo canceller 918, may be used to support the physical (PHY) layer of a networking stack running on the device 910. Intermission periods may be periods of pre-determined duration to ensure that the PHYs do not transmit simultaneously in a half-duplex mode. In some cases, the intermission periods may be selected based on a maximum allowed cable length. In other cases, intermission periods may be protocol defined. In other cases, intermission periods may be adjustable. For example, a device may select an intermission period during a calibration, e.g., automated, manufacturer-performed, or operator-performed. The device may then use the calibrated value for future operation. In some cases, subsequent re-calibrations may be performed.

The device 900 may further include auto-negotiation circuitry 922 which may support message page generation and exchange. The message pages may allow for exchange of network capabilities to allow devices in communication to select link protocols that are mutually supported by the communicating devices. The auto-negotiation circuitry 922 may also configure the transmission and reception parameters based on the condition of the transmission channel. The device 900 may measure the condition of the channel using channel characterization circuitry 924. The channel characterization circuitry 924 may analyze reflected signals or other received signals to gauge the channel quality.

Figure 10:
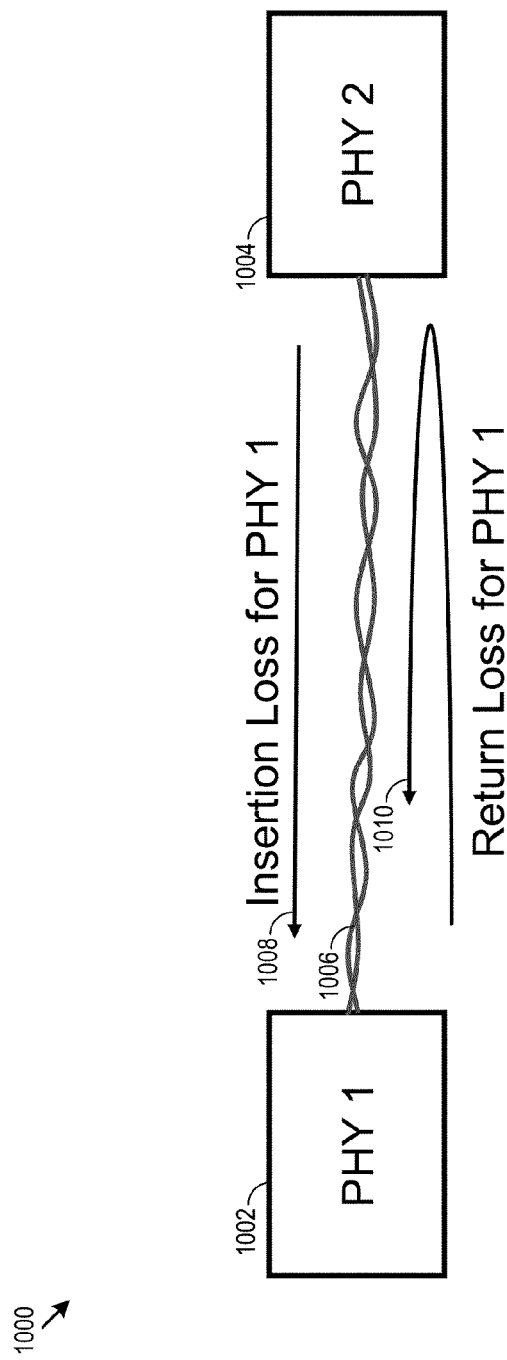
FIG. 10 shows an example return loss environment.

FIG. 10 shows an example return loss environment 1000. A device with a first physical (PHY) layer 1002 transmits a signal to a device with a second PHY layer 1004 via a twisted pair cable 1006. However, other transmission media, such as optical, coaxial, or other guided medium, may be used with the techniques described below. The insertion loss 1008 for the first PHY may include various losses incurred by connectors, cables, PHY layers, and/or other entities on the transmission channel. The return loss 1010, as discussed above, may originate from various reflections originating from discontinuities along the transmission path. Other forms of channel loss may include crosstalk and noise.

The first and second PHY layers 1002, 1004 may engage in auto-negotiation to determine respective capabilities. In some implementations, the auto negotiation period may be half-duplex. Additionally or alternatively, incoming signals to the PHY layers may not be filter. However, systems implementing filtering during the auto-negotiation period may use the return loss estimation techniques described. Once the PHY layers exchange their capability information and determine compatibility, a link may be established. In some implementations, the link may implement full-duplex communication, including some cases in which the auto-negotiation period used half-duplex communications.

Figure 11:
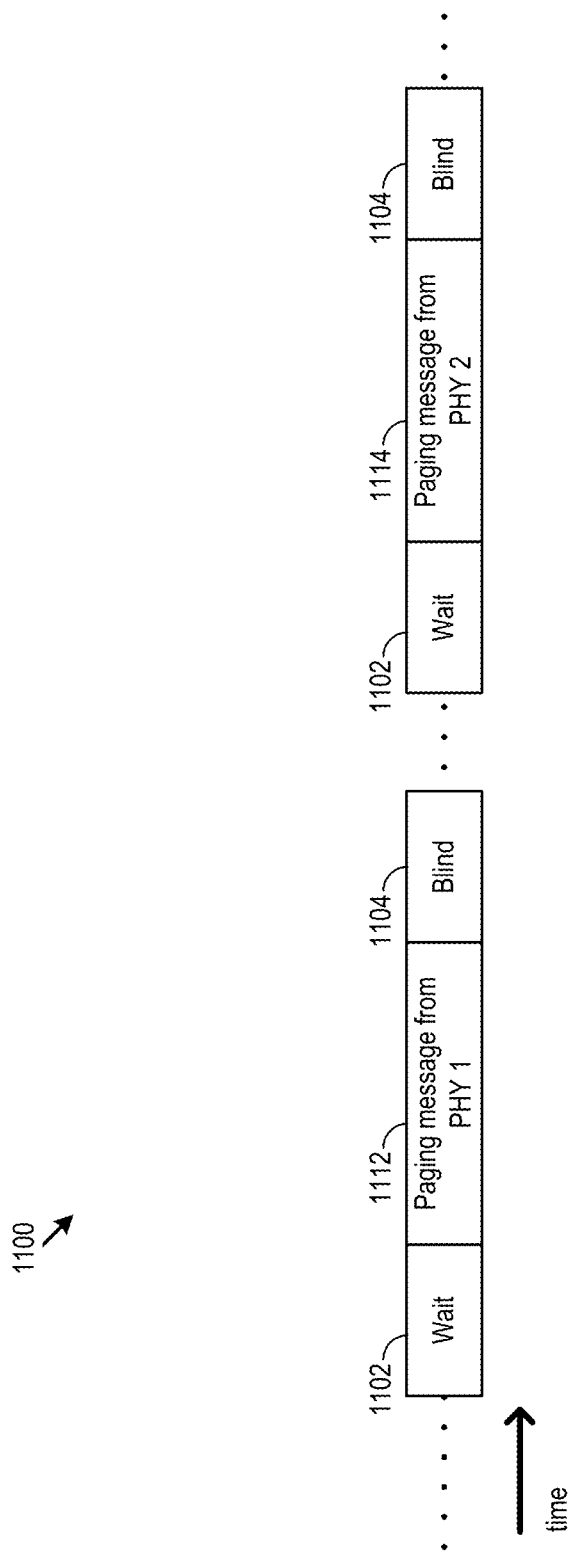
FIG. 11 shows an example auto-negotiation process.

FIG. 11 shows an example auto-negotiation process 1100. Message pages 1112 from the first PHY layer 1002 and message pages 1114 from the second PHY layer 1004 may be exchanged. Wait 1102 and blind 1104 periods, e.g., intermission periods, may be interspersed among the pages 1112, 1114.

Figure 12:
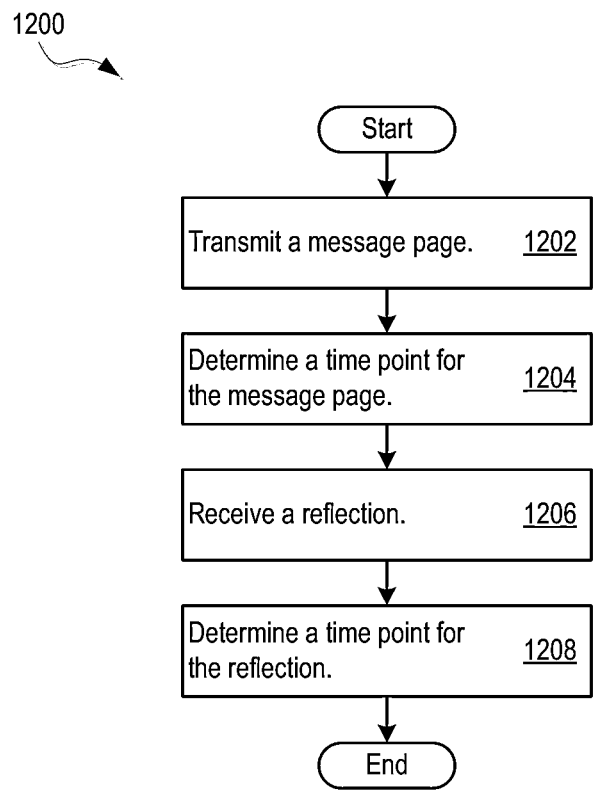
FIG. 12 shows example logic for estimating return loss characteristics.

In some implementations, return loss characteristics may be estimated by performing measurements during the wait and blind periods. FIG. 12 shows example logic 1200 for estimating return loss characteristics. The example logic may be implemented on circuitry, e.g., auto-negotiation circuitry 922 and channel characterization circuitry 924. A device may transmit a message page using transmission resources within its PHY layer (1202). The logic 1200 may determine a time point for the transmission (1204). For example, the logic 1200 may determine a time value corresponding to the point of transmission of a recognizable pattern and/or feature within the transmission. In various example systems, features may include a front edge of the transmission, a symbol (such as a start of transmission symbol, end of transmission symbol, or other symbol), a transmission peak, downward slope, phase transition, or other feature. The logic 1200 may receive one or more reflections from the transmission (1206). The logic 1200 may determine a time point for the reflection (1208). The difference between the timing for the transmission and the one or more reflections may be determined by the logic 1200.

In some implementations, discrete time values for the transmission and one or more reflections may not be determined. The timing differential may be established without measuring the discrete timing values. For example a correlation may be applied to the transmission and reflections and the timing differential may be extracted. In another example, the time value for the transmission may be considered a reference point and no absolute time may be established. The timing of the one or more reflections may be measured against the transmission timing as a reference.

The measurements may be made in the time domain or the frequency domain. For example, a timing shift may generate an interference pattern in the frequency domain proportional to the inverse of the timing shift.

The timing information may be used to set various parameters for a network interface. For example, the power back-off setting may be adjusted based on the characterization of the return loss. Additionally or alternatively, the timing of the first peak of the echo canceller may be estimated from the timing of the reflections. For example, the timing of the reflection may be used as a starting point for the echo canceller. In some cases, a more accurate starting point for the echo canceller may lead to faster adaptation than using a blind starting point. Additionally or alternatively, the return loss estimate may be used to estimate some of the characteristics of the insertion loss. For example, the discontinuities that contribute to reflection components may also contribute to insertion loss.

In some implementations, estimation of return loss characteristics during auto-negotiation may be advantageous. For example, 1G-BASE-T1 systems, such as automotive networks, may use fast auto-negotiations and link-up processes. Filtering may be used to handle the channel characteristics. In some case, filter training may be implemented. Obtaining knowledge of the characteristics of the return loss may increase the speed of convergence for echo cancelling filter training algorithms. A shorter training period may be associated with lower power consumption for adaptation of the filters. The reduced power for the adaptation may lower the steady state power dissipation of the device. Using the return loss information, the system may cancel echoes more quickly which may also reduce the burden associated with training insertion loss filters.

In an implementation, a device may include a transceiver and channel characterization circuitry. The transceiver may be configured to: transmit a first message over a channel of an automotive network to a communication node, the communication node configured to hold reverse transmission of a second message for an intermission period; and receive a reflection corresponding to the first message during the intermission period. The channel characterization circuitry may be configured to: perform an analysis of the reflection; and determine a characteristic of the channel responsive to the analysis.

In another implementation, a method may include: sending a first message over a channel of an automotive network to a communication node; receiving a reflection corresponding to the first message during an intermission period; performing an analysis of the reflection; and determining a characteristic of the channel responsive to the analysis. The communication node may be configured to hold a reverse transmission of a second message for the intermission period.

In yet another implementation, a device may include a transceiver, channel characterization circuitry, and auto-negotiation circuitry. The transceiver may be configured to: enter a half-duplex communication mode; transmit a first message over a channel of an automotive network to a communication node while in the half-duplex communication mode; during an intermission period, receive a reflection corresponding to the first message; and enter a negotiated communication mode responsive to a negotiation result indicator. The communication node may be configured to hold a review transmission of a second message for the intermission period after the transmission of the first message. The channel characterization circuitry may be configured to: perform an analysis of the reflection; and determine a characteristic of the channel responsive to the analysis. The auto-negotiation circuitry may be configured to: determine a communication parameter for the negotiated communication mode responsive to the characteristic of the channel; and send the negotiation result indicator to the transceiver.

The methods, devices, processing, and logic described above may be implemented in many different ways and in many different combinations of hardware and software. For example, all or parts of the implementations may be circuitry that includes an instruction processor, such as a Central Processing Unit (CPU), microcontroller, or a microprocessor; an Application Specific Integrated Circuit (ASIC), Programmable Logic Device (PLD), or Field Programmable Gate Array (FPGA); or circuitry that includes discrete logic or other circuit components, including analog circuit components, digital circuit components or both; or any combination thereof. The circuitry may include discrete interconnected hardware components and/or may be combined on a single integrated circuit die, distributed among multiple integrated circuit dies, or implemented in a Multiple Chip Module (MCM) of multiple integrated circuit dies in a common package, as examples.

The circuitry may further include or access instructions for execution by the circuitry. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed as circuitry among multiple system components, such as among multiple processors and memories, optionally including multiple distributed processing systems. Parameters, databases, and other data structures may be separately stored and managed, may be incorporated into a single memory or database, may be logically and physically organized in many different ways, and may be implemented in many different ways, including as data structures such as linked lists, hash tables, arrays, records, objects, or implicit storage mechanisms. Programs may be parts (e.g., subroutines) of a single program, separate programs, distributed across several memories and processors, or implemented in many different ways, such as in a library, such as a shared library (e.g., a Dynamic Link Library (DLL)). The DLL, for example, may store instructions that perform any of the processing described above or illustrated in the drawings, when executed by the circuitry.

Various implementations have been specifically described. However, many other implementations are also possible.

What is claimed is:

1. A device comprising:
    a transceiver configured to:
        enter a half-duplex transmission mode;
        while in the half-duplex transmission mode, transmit a first message page from a first physical layer of the device to a second physical layer of a communication node;
        enter a half-duplex reception mode;
        while in the half-duplex reception mode, receive a second message page from the second physical layer;
        responsive to a negotiation result message, enter a negotiated mode, the negotiated mode compatible with a first capability of the first physical layer and a second capability of the second physical layer; and
        establish a communication link between the first and second physical layers;
    negotiation circuitry configured to:
        generate first content of the first message page, the first content configured to indicate the first capability of the first physical layer;
        append first error checking information to the first content to generate the first message page;
        parse the second message page, to determine second content and second error checking information;
        compare the second error checking information to third error checking information;
        when the second error checking information matches the third error checking information, analyze the second content to determine the second capability; and
        responsive to the first and second capabilities, generate the negotiation result message; and
    checksum circuitry configured to:
        generate the first error checking information responsive to the first content; and
        generate the third error checking information responsive to the second content.

2. The device of claim 1, where the first error checking information comprises a cyclic redundancy check (CRC).

3. The device of claim 2, where the checksum circuitry is configured to generate the CRC responsive to a polynomial represented as $x^8+x^2+x+1$.

4. The device of claim 2, where the CRC comprises an 8-bit CRC.

5. The device of claim 4, where the negotiation circuitry is configured to append the first error checking information to the first content by appending the 8-bit CRC to a 48-bit message page that contains the first content.

6. The device of claim 1, where:
    the negotiation circuitry is further configured to append fourth error checking information to third content to generate a third message page;
    the first message page comprises a base page; and
    the third message page comprises a next page.

7. The device of claim 6, where the negotiation circuitry is configured to encode the next page according to a message encoding or an unformatted encoding.

8. The device of claim 1, where the communication link comprises a communication link over an automotive network.

9. The device of claim 1, where the negotiated mode comprises a full-duplex communication mode.

10. The device of claim 1, where the first capability comprises an error correction capability of the first physical layer.

11. A method comprising:
    with a transceiver of a device:
        entering a half-duplex transmission mode;
        while in the half-duplex transmission mode, transmitting a first message page from a first physical layer of the device to a second physical layer of a communication node;
        entering a half-duplex reception mode;
        while in the half-duplex reception mode, receiving a second message page from the second physical layer;
        responsive to a negotiation result message, entering a negotiated mode, the negotiated mode compatible with a first capability of the first physical layer and a second capability of the second physical layer; and
        establishing a communication link between the first and second physical layers;
    with negotiation circuitry:
        generating first content of the first message page, the first content configured to indicate the first capability of the first physical layer;
        appending first error checking information to the first content to generate the first message page;
        parsing the second message page, to determine second content and second error checking information;
        comparing the second error checking information to third error checking information;
        when the second error checking information matches the third error checking information, analyzing the second content to determine the second capability; and
        responsive to the first and second capabilities, generating the negotiation result message; and
    with checksum circuitry:
        generating the first error checking information responsive to the first content; and
        generating the third error checking information responsive to the second content.

12. The method of claim 11, where the first error checking information comprises a cyclic redundancy check (CRC).

13. The method of claim 12, further comprising generating, with the checksum circuitry, the CRC responsive to a polynomial represented as $x^8+x^2+x+1$.

14. The method of claim 12, where the CRC comprises an 8-bit CRC.

15. The method of claim 14, further comprising appending, with the negotiation circuitry, the first error checking information to the first content by appending the 8-bit CRC to a 48-bit message page that contains the first content.

16. The method of claim 11, further comprising appending, with the negotiation circuitry, fourth error checking information to third content to generate a third message page, where:
  the first message page comprises a base page; and
  the third message page comprises a next page.

17. The method of claim 16, further comprising encoding, with the negotiation circuitry, the next page according to a message encoding or an unformatted encoding.

18. The method of claim 11, where the communication link comprises a communication link over an automotive network.

19. The method of claim 11, where the negotiated mode comprises a full-duplex communication mode.

20. The method of claim 11, where the first capability comprises an error correction capability of the first physical layer.

* * * * *